US012665992B2

(12) United States Patent
Pertierra et al.

(10) Patent No.: US 12,665,992 B2
(45) Date of Patent: Jun. 23, 2026

(54) OPTICAL ARCHITECTURE FOR BEAM-STEERING PROJECTORS

(71) Applicants: Dolby Laboratories Licensing Corporation, San Francisco, CA (US); Dolby International AB, Dublin (IE)

(72) Inventors: Juan Pablo Pertierra, Fishers, IN (US); Clement Luc Carol Le Barbenchon, Los Angeles, CA (US); Angelo Miguel Pires Arrifano, Villeneuve-Loubet (FR); Duane Scott Dewald, Dallas, TX (US)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 0 days.

(21) Appl. No.: 18/868,416

(22) PCT Filed: May 24, 2023

(86) PCT No.: PCT/US2023/023345
§ 371 (c)(1),
(2) Date: Nov. 22, 2024

(87) PCT Pub. No.: WO2023/230126
PCT Pub. Date: Nov. 30, 2023

(65) Prior Publication Data
US 2025/0350706 A1 Nov. 13, 2025

Related U.S. Application Data

(60) Provisional application No. 63/345,472, filed on May 25, 2022.

(30) Foreign Application Priority Data

May 25, 2022 (EP) ..................................... 22175389

(51) Int. Cl.
*H04N 9/31* (2006.01)

(52) U.S. Cl.
CPC .......... *H04N 9/3155* (2013.01); *H04N 9/312* (2013.01)

(58) Field of Classification Search
CPC ........ H04N 9/3126; H04N 9/315; H04N 9/31; H04N 9/3155; H04N 9/312; H04N 9/3152;
(Continued)

(56) References Cited

U.S. PATENT DOCUMENTS 7,791,560 B2 9/2010 Smith
7,859,972 B2 12/2010 Kasazumi
(Continued)

FOREIGN PATENT DOCUMENTS

EP 2869104 A1 5/2015
EP 3418798 A1 12/2018
(Continued)

*Primary Examiner* — Sherrie Hsia

(57) ABSTRACT

A beam-steering projection system includes a light source configured to emit a light in response to image signal, a phase light modulator, and a spatial light modulator. The phase light modulator is configured to receive the light from the light source and to apply a spatially-varying phase modulation on the light, thereby to steer the light at an illumination angle and generate a first steered light. The spatial light modulator is configured to receive the first steered light, to apply a spatially-varying amplitude modulation on the light, to steer the light towards a projection optics system and to generate a second steered light. A plane of a secondary image constructed after the phase light modulator and before the spatial light modulator is parallel with the phase light modulator.

16 Claims, 4 Drawing Sheets

(58) Field of Classification Search
CPC .. H04N 9/3161; G03B 21/005; G03B 21/008; G03B 21/28
USPC ................. 348/744, 758; 353/37, 50, 64, 98
See application file for complete search history.

(56) References Cited

U.S. PATENT DOCUMENTS

| | | | |
|---|---|---|---|
| 8,727,543 | B2 | 5/2014 | Kurashige |
| 9,046,734 | B2 | 6/2015 | Haussler |
| 10,146,180 | B2 | 12/2018 | Leister |
| 10,197,902 | B2 | 2/2019 | Dewald |
| 10,416,539 | B2 | 9/2019 | Pertierra |
| 10,534,251 | B2 | 1/2020 | Dewald |
| 2019/0260977 | A1 | 8/2019 | Mcgrew |
| 2020/0117018 | A1 | 4/2020 | Sakai |
| 2020/0326464 | A1 | 10/2020 | Gomes |
| 2020/0348531 | A1 | 11/2020 | Popovich |

| | | | |
|---|---|---|---|
| 2021/0141238 | A1 | 5/2021 | Pertierra |
| 2021/0199963 | A1 | 7/2021 | Li |
| 2023/0188685 | A1* | 6/2023 | Pertierra ............. H04N 9/3152 348/744 |
| 2024/0142861 | A1 | 5/2024 | Pertierra |
| 2024/0163408 | A1 | 5/2024 | Pires Arrifano |
| 2024/0171710 | A1 | 5/2024 | Pertierra |

FOREIGN PATENT DOCUMENTS

| | | |
|---|---|---|
| WO | 2015173556 A1 | 11/2015 |
| WO | 2015173558 A1 | 11/2015 |
| WO | 2015184549 A1 | 12/2015 |
| WO | 2017064245 A1 | 4/2017 |
| WO | 2018179980 A1 | 10/2018 |
| WO | 2019195182 A1 | 10/2019 |
| WO | 2020016214 A1 | 1/2020 |
| WO | 2020150523 A1 | 7/2020 |
| WO | 2020190823 A1 | 9/2020 |

* cited by examiner

OPTICAL ARCHITECTURE FOR BEAM-STEERING PROJECTORS

CROSS-REFERENCE TO RELATED APPLICATIONS

This application is a U.S. National Stage application under U.S.C. 371 of International Application No. PCT/US2023/023345, filed on May 24, 2023, which claims priority from the following priority applications: U.S. provisional application 63/345,472, filed 25 May 2022, and European Patent application no. 22175389, filed 25 May 2022.

BACKGROUND

1. Field of the Disclosure

This application relates generally to projection systems and optic configurations within projection systems.

2. Description of Related Art

Digital projection systems typically utilize a light source and an optical system to project an image onto a surface or screen. The optical system includes components such as mirrors, lenses, waveguides, optical fibers, beam splitters, diffusers, spatial light modulators (SLMs), phase light modulators (PLMs), and the like. Some optical systems include a light-steering pre-modulator that effectively modulates the phase of the light followed by a second modulator that effectively modulates the amplitude of the light. The modulators may be configured as a digital light processor (DLP), a digital micromirror device (DMD), a liquid crystal on silicon (LCOS) modulator, or another appropriate modulator.

BRIEF SUMMARY OF THE DISCLOSURE

DLPs and PLMs may both be configured as digital micromirror devices (DMDs) that include a plurality of micromirrors to manipulate light. Algorithms for controlling a DLP modulate light by independently tilting each micromirror to either direct the light towards the desired optical path, or away from the desired optical path and towards a "light dump". Algorithms for controlling a PLM modulate light by independently moving each micromirror up or down with respect to the PLM housing, adjusting the phase of the light. Other algorithms for controlling a PLM modulate light by controlling a refractive index of a liquid-crystal medium. Both DLPs and PLMs have theoretical optimal illumination angles at which the quality of the light being steered is maintained and distortions are reduced. Embodiments described herein utilize the reconstruction plane of the image created by a first modulator in the optical path to improve the optical efficiency of the optical system.

Various aspects of the present disclosure relate to devices, systems, and methods for projection display.

In one exemplary aspect of the present disclosure, there is provided a beam-steering projection system comprising a light source configured to emit a light in response to an image signal, a phase light modulator, and a spatial light modulator. The image signal includes image data. The phase light modulator is configured to receive the light from the light source and to apply a spatially-varying phase modulation on the light, thereby to steer the light at an illumination angle and generate a first steered light. The spatial light modulator is configured to receive the first steered light, to apply a spatially-varying amplitude modulation on the light, to steer the light towards a projection optics system and to generate a second steered light. A plane of a secondary image constructed after the phase light modulator and before the spatial light modulator is parallel with the phase light modulator.

In another exemplary aspect of the present disclosure, there is provided a beam-steering projection system comprising a light source, a first modulator, imaging relay optics, and a second modulator. The light source is configured to emit a light. The first modulator is configured to receive the light from the light source and to apply a spatially-varying phase modulation on the light, thereby to steer the light at a first illumination angle and generate a first steered light. The imaging relay optics are configured to receive the first steered light and generate a second steered light at a second illumination angle. The second modulator is configured to receive the second steered light, to apply a spatially-varying amplitude modulation on the light, to steer the light towards a projection optics system and to generate a third steered light. A plane of a secondary image constructed after the first modulator and before the second modulator is parallel with the first modulator.

In another exemplary aspect of the present disclosure, there is provided a method for a beam-steering projection system. The projection system includes a light source configured to emit a light, a phase light modulator configured to receive the light from the light source and to apply a spatially-varying phase modulation on the light, thereby to steer the light at an illumination angle and generate a first steered light, and a spatial light modulator configured to receive the first steered light and to apply a spatially-varying amplitude modulation on the light, thereby to steer the light towards a projection optics system. The method includes receiving, with the phase light modulator, the light from the light source, and steering, with the phase light modulator, the light at an illumination angle to generate a first steered light. The method further includes constructing a reconstructed image on a reconstructed image plane with the first steered light, and receiving, with the spatial light modulator, the first steered light.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware, devices, or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing summary is intended solely to give a general idea of various aspects of the present disclosure and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to project light; for example, cinema, consumer, and other commercial projection systems, heads-up displays, virtual reality displays, and the like.

Projector Systems

Light-steering modulators may create an image at a plane different from the modulator plane itself. This plane may be a virtual plane or a real plane. Light-steering modulators may have flat mirror surfaces, and therefore typically have no native illumination angle other than some configuration which allows normal illumination. Light-steering modulators may create an image or object on the modulator itself and have angled mirrors.

Optical systems described herein reconstruct an image optically respective to the pre-modulator. Images may be reconstructed optically downstream or optically upstream from the pre-modulator. Under the condition where the reconstructed pre-modulator is parallel to the pre-modulator, the angle between the reconstructed image and the optical axis is controlled according to an illumination angle, described below in more detail. The reconstructed pre-modulator image is itself imaged onto the primary modulator, but the object plane in this imaging operation is tilted.

Figure 1:
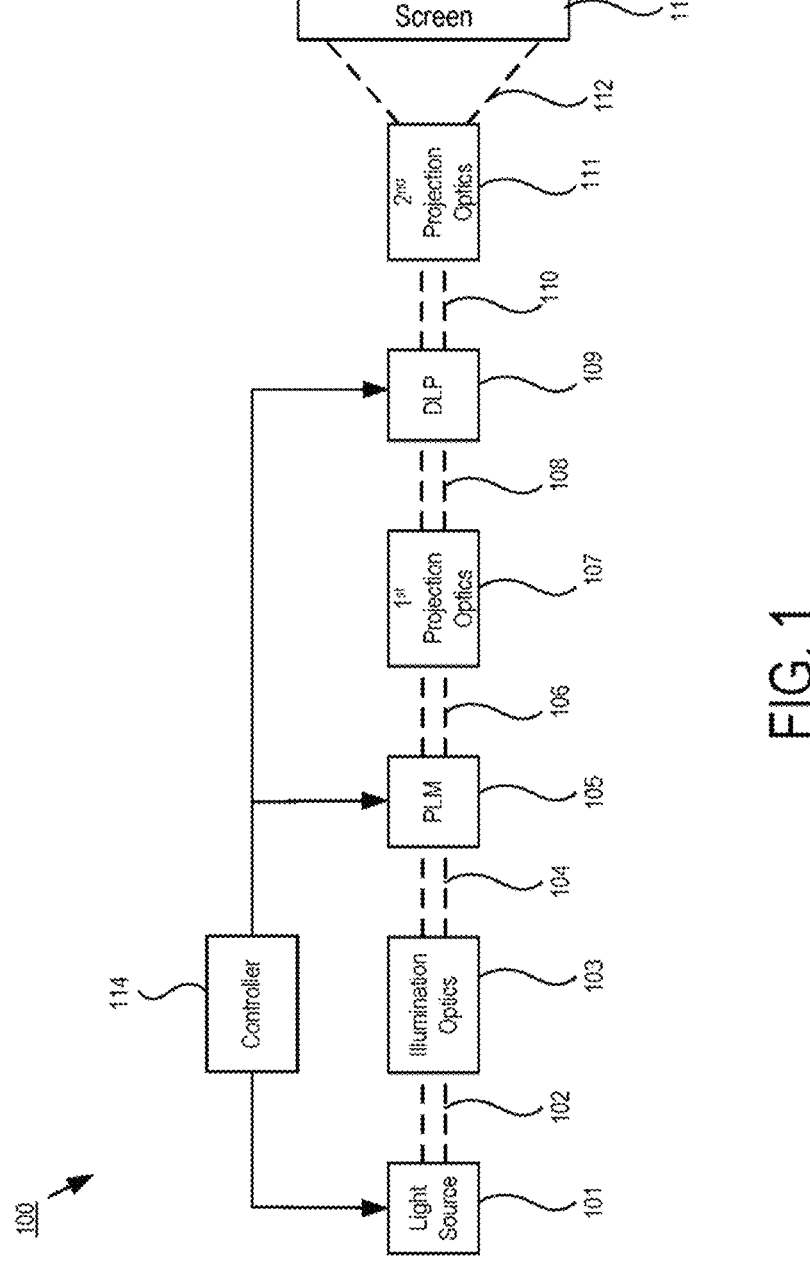
FIG. 1 illustrates a block diagram of an exemplary projection system according to various aspects of the present disclosure.

FIG. 1 illustrates an exemplary high contrast projection system 100 according to various aspects of the present disclosure. In particular, FIG. 1 illustrates a projection system 100 which includes a light source 101 configured to emit a first light 102; illumination optics 103 (one example of an illumination optical system in accordance with the present disclosure) configured to receive the first light 102 and redirect or otherwise modify it, thereby to generate a second light 104; a PLM 105 configured to apply a spatially-varying phase modulation to the second light 104, thereby to steer the second light 104 and generate a third light 106; first projection optics 107 configured to receive the third light 106 and redirect or otherwise modify it, thereby to generate a fourth light 108; a DLP 109 configured to modulate the fourth light 108, thereby to generate a fifth light 110; and second projection optics 111 configured to receive the fifth light 110 and project it as a sixth light 112 onto a screen 113. The DLP 109 may be an amplitude-based SLM or other modulator.

The projection system 100 further includes a controller 114 configured to control various components of the projection system 100, such as the light source 101, the PLM 105, and/or the DLP 109. In some implementations, the controller 114 may additionally or alternatively control other components of the projection system 100, including but not limited to the illumination optics 103, the first projection optics 107, and/or the second projection optics 111. The controller 114 may be one or more processors such as a central processing unit (CPU) of the projection system 100. The illumination optics 103, the first projection optics 107, and the second projection optics 111 may respectively include one or more optical components such as mirrors, lenses, waveguides, optical fibers, beam splitters, diffusers, and the like. With the exception of the screen 113, the components illustrated in FIG. 1 may be integrated into a housing to provide a projection device. Such a projection device may include additional components such as a memory, input/output ports, communication circuitry, a power supply, and the like.

The light source 101 may be, for example, a laser light source, an LED, and the like. Generally, the light source 101 is any light emitter which emits light. In some implementations, the light is coherent light. In some aspects of the present disclosure, the light source 101 may comprise multiple individual light emitters, each corresponding to a different wavelength or wavelength band. The light source 101 may include a dimming device that optically or opto-mechanically dynamically changes the intensity and/or the etendue of emitted light. The light source 101 emits light in response to an image signal provided by the controller 114; for example, one or more processors such as a central processing unit (CPU) of the projection system 100. The image signal includes image data corresponding to a plurality of frames to be successively displayed. Individual elements in the projection system 100, including the illumination optics 103 and/or the PLM 105, may be controlled by the controller 114. The image signal may originate from an external source in a streaming or cloud-based manner, may originate from an internal memory of the projection system 100 such as a hard disk, may originate from a removable medium that is operatively connected to the projection system 100, or combinations thereof.

The first projection optics 107 and/or the second projection optics 111 may include a filter to mitigate effects caused by internal components of the projection system 100. In some systems, the PLM 105 (which will be described in more detail below) may include a cover glass and cause reflections, device switching may temporarily cause unwanted steering angles, and various components may cause scattering. To counteract this and decrease the floor level of the projection system 100, the filter may be a Fourier ("DC") filter component configured to block a portion of the third light 106 and/or the fifth light 110. Thus, the filter may increase contrast by reducing the floor level from light near zero angle, which will correspond to such elements as cover-glass reflections, stroke transition states, and the like. This DC block region may be actively used to prevent certain light from reaching the screen. Additionally, the filter may mitigate modal noise from the light source 101 (such as a fiber coupled laser) that is reflected off the cover glass and has energy at small angles relative to a majority of the emitted light. One example of reducing cover glass noise is provided in PCT Patent Application No. PCT/US2020/013950, "Attenuating Wavefront Determination for Noise Reduction", by Angelo P. Arrifano and Juan P. Pertierra, which is incorporated herein by reference. In some aspects of the present disclosure, the filter prevents the undesired light from reaching the screen by steering said light to a light dump located outside the active image area, in response to control from the controller 114.

Although FIG. 1 illustrates a generally linear optical path, in practice the optical path is generally more complex. For example, in the projection system 100, the second light 104 from the illumination optics 103 is steered to the PLM 105 at an oblique angle, and the fourth light 108 steered from the first projection optics 107 is steered to the DLP 109 at an oblique angle. In order to ensure that the image on the screen 113 has an acceptable clarity and contrast ratio, the illumination optics 103 may be designed and/or controlled to ensure that the angle of incidence on the PLM 105 is correct, while maintaining the position of the second light 104 centered on the PLM 105. The PLM 105 and/or the first projection optics 107 may be designed and/or controlled to ensure that the angle of incidence on the DLP 109 is correct, while maintaining the position of the fourth light 108 centered on the DLP 109.

Digital Light Processor

Figure 2A:
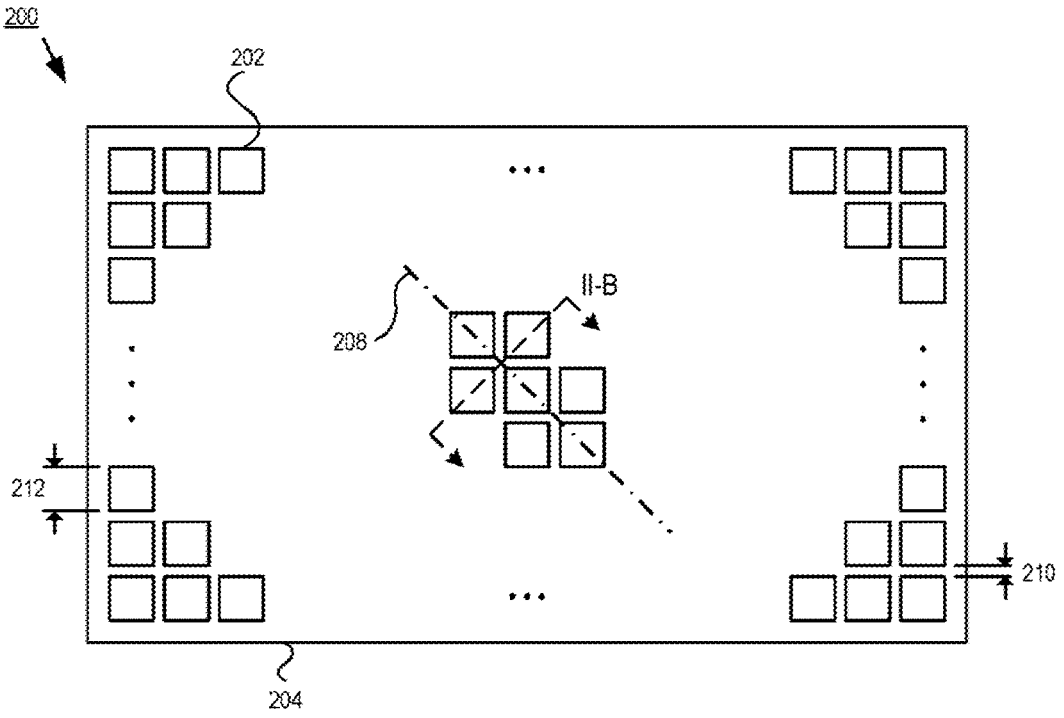
FIG. 2A illustrates a plan view of an exemplary spatial light modulator for use with various aspects of the present disclosure.
Figure 2B:
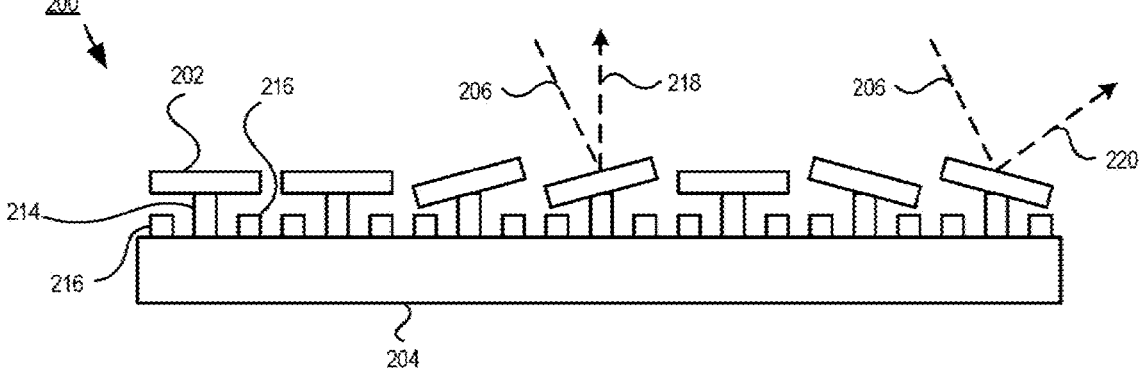
FIG. 2B illustrates a cross-sectional view taken along the line II-B of FIG. 2A.

In some implementations, the DLP 109 is a digital micromirror device (DMD) composed of a plurality of mirrors used to adjust the angle of incidence of light (e.g., the fourth light 108). To illustrate the effects of the angle of incidence and the DMD mirrors, FIGS. 2A-2B show an exemplary DMD 200 in accordance with various aspects of the present disclosure. In particular, FIG. 2A illustrates a plan view of the DMD 200, and FIG. 2B illustrates partial cross-sectional view of the DMD 200 taken along line II-B illustrated in FIG. 2A. The DMD 200 includes a plurality of square micromirrors 202 arranged in a two-dimensional rectangular array on a substrate 204. Each micromirror 202 may correspond to one pixel of the eventual projection image, and may be configured to tilt about a rotation axis 208, shown for one particular subset of the micromirrors 202, by electrostatic or other type of actuation. The individual micromirrors 202 have a width 212 and are arranged with gaps of width 210 therebetween. The micromirrors 202 may be formed of or coated with any highly reflective material, such as aluminum or silver, to thereby specularly reflect light. The gaps between the micromirrors 202 may be absorptive, such that input light which enters a gap is absorbed by the substrate 204.

While FIG. 2A expressly shows only some representative micromirrors 202, in practice the DMD 200 may include many more individual micromirrors in a number equal to a resolution of the projection system 100. In some examples, the resolution may be 2K (2048×1080), 4K (4096×2160), 1080p (1920×1080), consumer 4K (3840×2160), and the like. Moreover, in some examples the micromirrors 202 may be rectangular and arranged in the rectangular array; hexagonal and arranged in a hexagonal array, and the like. Moreover, while FIG. 2A illustrates the rotation axis 208 extending in an oblique direction, in some implementations the rotation axis 208 may extend vertically or horizontally.

As can be seen in FIG. 2B, each micromirror 202 may be connected to the substrate 204 by a yoke 214, which is rotatably connected to the micromirror 202. The substrate 204 includes a plurality of electrodes 216. While only two electrodes 216 per micromirror 202 are visible in the cross-sectional view of FIG. 2B, each micromirror 202 may in practice include additional electrodes. While not particularly illustrated in FIG. 2B, the DMD 200 may further include spacer layers, support layers, hinge components to control the height or orientation of the micromirror 202, and the like. The substrate 204 may include electronic circuitry associated with the DMD 200, such as complementary metal-oxide semiconductor (CMOS) transistors, memory elements, and the like.

Depending on the particular operation and control of the electrodes 216, the individual micromirrors 202 may be switched between an "on" position, an "off" position, and an unactuated or neutral position. If a micromirror 202 is in the on position, it is actuated to an angle of (for example) −12° (that is, rotated counterclockwise by 12° relative to the neutral position) to specularly reflect input light 206 into on-state light 218. If a micromirror 202 is in the off position, it is actuated to an angle of (for example) +12° (that is, rotated clockwise by 12° relative to the neutral position) to specularly reflect the input light 206 into off-state light 220. The off-state light 220 may be directed toward a light dump that absorbs the off-state light 220. In some instances, a micromirror 202 may be unactuated and lie parallel to the substrate 204. The particular angles illustrated in FIGS. 2A-2B and described here are merely exemplary and not limiting. In some implementations, the on- and off-position angles may be between +11 and +13 degrees (inclusive), respectively. In other implementations, the on- and off-position angles may be between +10 and +18 degrees (inclusive), respectively.

Phase Light Modulator

As illustrated in FIG. 1, the controller 114 also controls the PLM 105, which receives light from the light source 101. The PLM 105 imparts a spatially-varying phase modulation to the light, and redirects the modulated light toward the first projection optics 107. The PLM 105 may be a reflective type, in which the PLM 105 reflects incident light with a spatially-varying phase; alternatively, the PLM 105 may be of a transmissive type, in which the PLM 105 imparts a spatially-varying phase to light as it passes through the PLM 105. In some aspects of the present disclosure, the PLM 15 has a liquid crystal on silicon (LCOS) architecture. In other aspects of the present disclosure, the PLM 105 has a micro-electromechanical system (MEMS) architecture.

Figure 3:
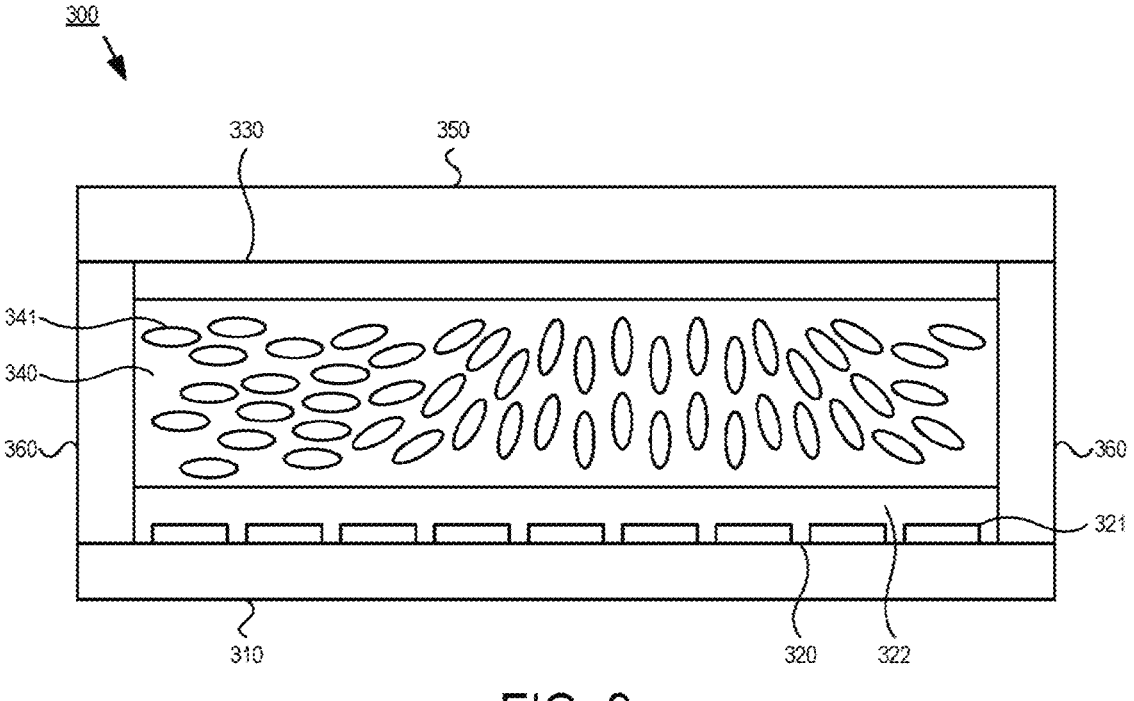
FIG. 3 illustrates a plan view of an exemplary phase light modulator for use with various aspects of the present disclosure.

FIG. 3 illustrates one example of the PLM 105, implemented as a reflective LCOS PLM 300 and shown in a partial cross-sectional view. As illustrated in FIG. 3, the PLM 300 includes a silicon backplane 310, a first electrode layer 320, a second electrode layer 330, a liquid crystal layer 340, a cover glass 350, and spacers 360. The silicon backplane 310 includes electronic circuitry associated with the PLM 300, such as CMOS transistors and the like. The first electrode layer 320 includes an array of reflective elements 321 disposed in a transparent matrix 322. The reflective elements 321 may be formed of any highly optically reflective material, such as aluminum or silver. The transparent matrix 322 may be formed of any highly optically transmissive material, such as a transparent oxide. The second electrode layer 330 may be formed of any optically transparent electrically conductive material, such as a thin film of indium tin oxide (ITO). The second electrode layer 330 may be provided as a common electrode corresponding to a plurality of the reflective elements 321 of the first electrode layer 320. In such a configuration, each of the plurality of the reflective elements 321 will couple to the second electrode layer 330 via a respective electric field, thus dividing the PLM 300 into an array of pixel elements. Thus, individual ones (or subsets) of the plurality of the reflective elements 321 may be addressed via the electronic circuitry disposed in the silicon backplane 310, thereby to modify the state of the corresponding reflective element 321.

The liquid crystal layer 340 is disposed between the first electrode layer 320 and the second electrode layer 330, and includes a plurality of liquid crystals 341. The liquid crystals 341 are particles which exist in a phase intermediate a solid and a liquid; in other words, the liquid crystals 341 exhibit a degree of directional order, but not positional order. The direction in which the liquid crystals 341 tend to point is referred to as the "director." The liquid crystal layer 340 modifies incident light entering from the cover glass 350 based on the birefringence $\Delta n$ of the liquid crystals 341, which may be expressed as the difference between the refractive index in a direction parallel to the director and the refractive index in a direction perpendicular to the director. From this, the maximum optical path difference may be expressed as the birefringence multiplied by the thickness of the liquid crystal layer 240. This thickness is set by the spacer 260, which seals the PLM 300 and ensures a set distance between the cover glass 350 and the silicon backplane 310. The liquid crystals 341 generally orient themselves along electric field lines between the first electrode layer 320 and the second electrode layer 330. As illustrated in FIG. 3, the liquid crystals near the center of the PLM 300 are oriented in this manner, whereas the liquid crystals 241 near the periphery of the PLM 300 are substantially non-oriented in the absence of electric field lines. By addressing individual ones of the plurality of reflective elements 321 via a phase-drive signal, the orientation of the liquid crystals 341 may be determined on a pixel-by-pixel basis.

Figure 4:
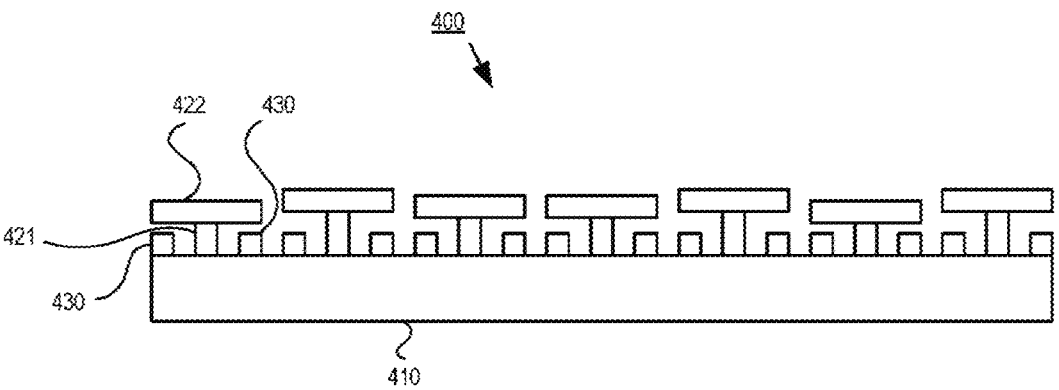
FIG. 4 illustrates a cross-sectional view of another exemplary phase light modulator for use with various aspects of the present disclosure.

FIG. 4 illustrates another example of the PLM 105, implemented as a DMD PLM 400 and shown in a partial cross-sectional view. As illustrated in FIG. 4, the PLM 400 includes a backplane 410 and a plurality of controllable reflective elements as pixel elements, each of which includes a yoke 421, a mirror plate 422, and a pair of electrodes 430. While only two electrodes 430 are visible in the cross-sectional view of FIG. 4, each reflective element may in practice include additional electrodes. While not particularly illustrated in FIG. 4, the PLM 400 may further include spacer layers, support layers, hinge components to control the height or orientation of the mirror plate 422, and the like. The backplane 410 includes electronic circuitry associated with the PLM 400, such as CMOS transistors, a memory array, and the like.

The yoke 421 may be formed of or include an electrically conductive material so as to permit a biasing voltage to be applied to the mirror plate 422. The mirror plate 422 may be formed of any highly reflective material, such as aluminum or silver. The electrodes 430 are configured to receive a first voltage and a second voltage, respectively, and may be individually addressable. Depending on the values of a voltage on the electrodes 430 and a voltage (for example, the biasing voltage) on the mirror plate 422, a potential difference exists between the mirror plate 422 and the electrodes 430, which creates an electrostatic force that operates on the mirror plate 422. The yoke 421 is configured to allow vertical movement of the mirror plate 422 in response to the electrostatic force. The equilibrium position of the mirror plate 422, which occurs when the electrostatic force and a spring-like force of the yoke 421 are equal, determines the optical path length of light reflected from the upper surface of the mirror plate 422. Thus, individual ones of the plurality of controllable reflective elements are controlled to provide a number (as illustrated, three) of discrete heights and thus a number of discrete phase configurations or phase states. As illustrated, each of the phase states has a flat profile. In some aspects of the present disclosure, the electrodes 430 may be provided with different voltages from one another so as to impart a tilt to the mirror plate 422. Such tilt may be utilized with a light dump of the type described above.

The PLM 400 may be capable of high switching speeds, such that the PLM 400 switches from one phase state on the order of tens of μs, for example. In order to provide for a full cycle of phase control, the total optical path difference between a state where the mirror plate 422 is at its highest point and a state whether the mirror plate 422 is at its lowest point should be approximately equal to the wavelength $\lambda$ of incident light. Thus, the height range between the highest point and the lowest point should be approximately equal to $\lambda/2$.

In some implementations, the PLM 105 creates fixed diffraction orders, where the mirror plates 422 produce multiple "copies" of the light impinging onto them. The PLM 105 steers the light within the extent of each diffraction order, producing multiple image "copies" at the reconstruction plane. An image steered by the PLM 105 may be formed on an image reconstruction plane at a distance at which the diffraction orders separate without overlapping. In some implementations, the image reconstruction plane is closer to the PLM 105 to alleviate blurring of the reconstructed image. A Fourier filter is implemented with the PLM 105 to remove overlap of diffraction orders at the image reconstruction plane. In some implementations, the diffraction patterns constructively interfere with each other to form the reconstructed image. Accordingly, if a portion of the light steered by the PLM 105 is blocked, the reconstructed image blurs compared to a reconstructed image including all light from the PLM 105.

Optical Architecture

Figure 5:
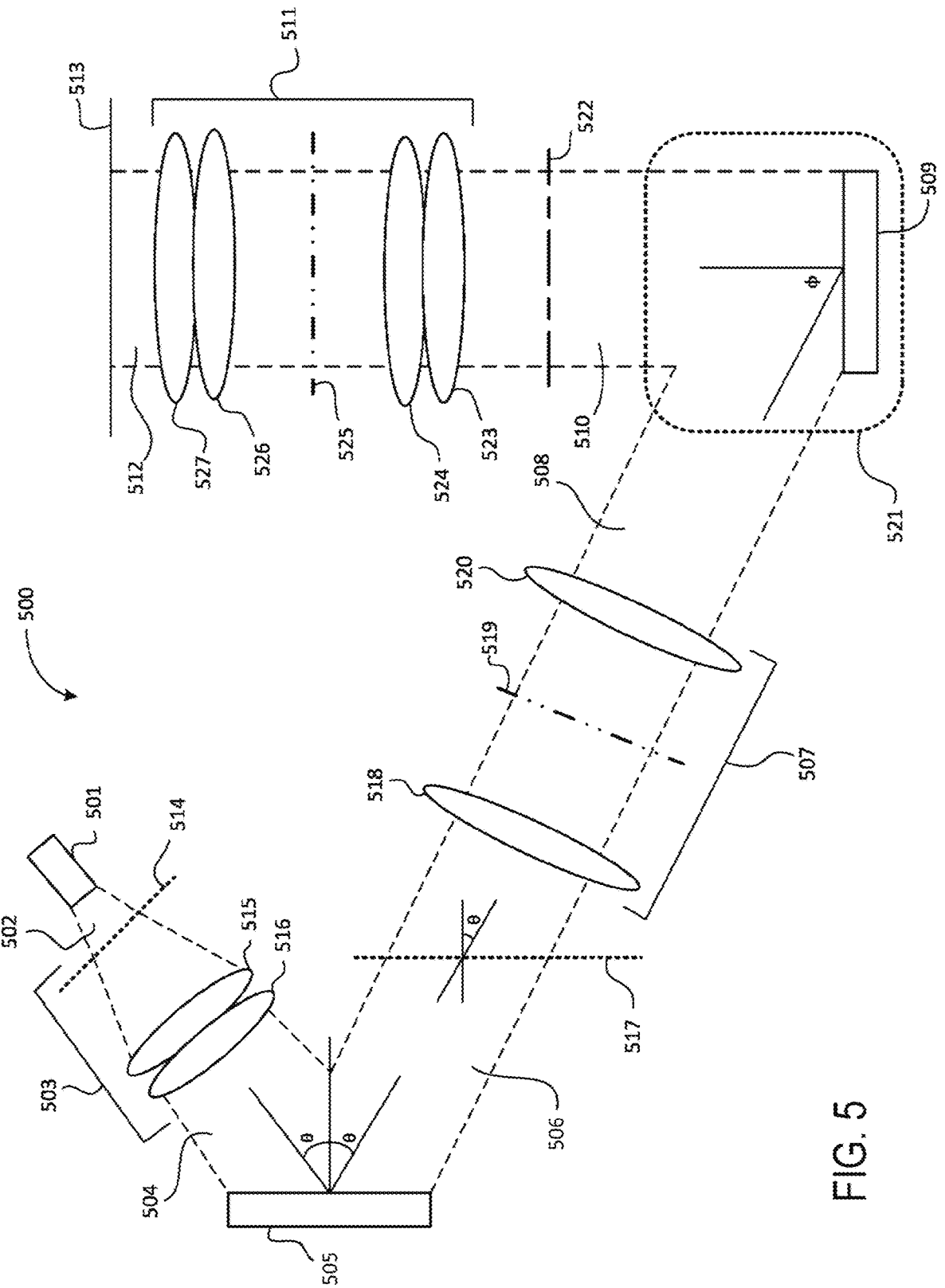
FIG. 5 illustrates an exemplary optical state in an exemplary projection system according to various aspects of the present disclosure.

One exemplary implementation of the present disclosure provides an optical system having a first light-steering pre-modulator, such as a PLM, followed by a second modulator, such as a DLP. FIG. 5 illustrates an exemplary optical state of a partial optical system 500 in accordance with the present disclosure. The partial optical system 500 may be an example, at least in part, of the projection system 100.

In particular, FIG. 5 illustrates a light source 501, a first light 502, illumination optics 503, a second light 504, a first modulator 505, a third light 506, illumination relay optics 507, a fourth light 508, a second modulator 509, a fifth light 510, second projection optics 511, a sixth light 512, and an optical output 513. Various elements illustrated in FIG. 5 may correspond to various elements (or parts of various elements) illustrated in FIG. 1. In some implementations, the first modulator 505 is a PLM device, and the second modulator 509 is a DLP device. In other implementations, the first modulator 505 is a DLP device, and the second modulator 509 is a PLM device. In some implementations, the first modulator 505 is within a prism, such as a prism that converts light in the RGB color domain to white light for modulation. In some examples, the second modulator 509 is within a prism 521, such as a prism that converts light in the RGB color domain to white light.

In the implementation illustrated in FIG. 5, the illumination optics 503 includes a first diffuser 514, a first lens 515, and a second lens 516. The first diffuser 514 may alter the first light 502 and create a desired point-spread-function (PSF) for the second light 504 received by the first modulator 505. In some implementations, the first diffuser 514 is synchronized with the first modulator 505 and/or the second modulator 509. Additionally, in some examples, the first diffuser 514 is spinning. In other examples, the first diffuser 514 is stationary. In some implementations, the first diffuser 514 may blur the image projected by the light source 501, preventing the need for precise registration requirements.

Although shown as including two lenses, the illumination optics 503 may be composed of any number of lenses to direct the first light 502 to the first modulator 505 at a predetermined illumination angle θ. Moreover, while each individual lens is separately illustrated, the individual lenses may be cemented to one another. Additionally, each lens group may be composed of any type of lenses, such as concave lenses, collimator lenses, negative meniscus lenses, and positive meniscus lenses.

In the implementation illustrated in FIG. 5, the illumination relay optics 507 (e.g., imaging relay optics) includes a third lens 518, a first filter 519, and a fourth lens 520. In other implementations, the illumination relay optics 507 may not include the first filter 519. The first filter 519 may include an aperture configured to pass a predetermined diffractive order, or predetermined illumination angle, of the third light 506. For example, the first filter 519 may include a "Fourier part" or "Fourier lens assembly" which refers to an optical system that spatially Fourier transforms modulated light (e.g., light from the first modulator 505) by focusing the modulated light onto a Fourier plane. The spatial Fourier transform imposed by the Fourier part converts the propagation angle of each diffraction order of the modulated light to a corresponding spatial position on the Fourier plane. the Fourier part thereby enables selection of desired diffraction orders, and rejection of undesired diffraction orders, by spatial filtering at the Fourier plane. For example, the Fourier part may be configured to pass projected light at an angle of 12°. The spatial Fourier transform of the modulated light at the Fourier plane is equivalent to a Fraunhofer diffraction pattern of the modulated light. In some implementations, the first filter 519 blocks light components that elevate black level, thereby decreasing the black level and improving the effective contrast ratio of the first modulator 505. In some implementations, the first filter 519 is optically situated between the first modulator 505 and the third lens 518 to improve characteristics of light modulated by the first modulator 505.

Although shown as including two lenses, the illumination relay optics 507 may be composed of any number of lenses to direct the fourth light 508 to the second modulator 509 at a second predetermined illumination angle q. Moreover, while each individual lens is separately illustrated, the individual lenses may be cemented to one another. In some examples, the third lens 518 and the fourth lens 520 may be composed of several lenses forming a lens group. Additionally, each lens or lens group may be composed of any type of lenses, such as concave lenses, negative meniscus lenses, and positive meniscus lenses.

In the implementation of FIG. 5, the second projection optics 511 includes a fifth lens 523, a sixth lens 524, a second filter 525, a seventh lens 526, and an eighth lens 527. In other implementations, the second projection optics 511 may not include the second filter 525. The second filter 525 may be functionally similar to the first filter 519 (e.g., including a "Fourier part"). In some implementations, the second filter 525 is configured to improve the black level of the second modulator 509. In some implementations, the optical system 500 includes a window actuator 522 situated optically between the second modulator 509 and the second projection optics 511. The window actuator 522 is configured to increase the resolution of the image reflected by the second modulator 509 (e.g., the fifth light 510). For example, the window actuator 522 may upscale the image reflected by the second modulator 509 from a 720p image to a 1080p image, a 1080p image to a 2K image, a 2K image to a 4K image, or the like. In some implementations, the optical system 500 includes a second diffuser 517. The second diffuser 517 may define a plane on which the image from the first modulator 505 is reconstructed (e.g., a reconstructed image plane). In some implementations, the reconstructed image plane is parallel with the first modulator 505. The second diffuser 517 may also add angular diversity to the third light 506 after the image is reconstructed, reducing the impact of dust and other obstructions within the optical system 500. In some implementations, the second diffuser 517 is synchronized with the first modulator 505 and/or the second modulator 509. Additionally, in some examples, the second diffuser 517 is spinning. In other examples, the second diffuser 517 is stationary.

In other implementations, the reconstructed image plane is separate from the second diffuser 517. For example, the reconstructed image plane may be located optically upstream or optically downstream of the second diffuser 517. In implementations where the optical system 500 does not include the second diffuser 517, the reconstructed image plane may be located optically upstream or optically downstream of the illumination relay optics 507 and optically between the first modulator 505 and the second modulator 509. Additionally, in some implementations, the reconstructed image plane may be angularly offset from the first modulator 505. In such an implementation, the illumination relay optics 507 may be configured to control the third light 506 such that the reconstructed image contacts the second modulator 509 at the desired angle. For example, the image plane of the illumination relay optics 507 between the second diffuser 517 and the second modulator 509 is tilted to correspond with a second illumination angle φ, or the illumination angle of the second modulator 509. This provides for a focused image of the reconstructed image on the entire surface of the second modulator 509. In other implementations, a piece of glass or an additional lens, such as a tilted or decentered lens element or glass prismatic elements is utilized to tilt the reconstructed image plane such that the reconstructed image contacts the second modulator 509 at the desired angle.

In some implementations, the image reconstruction plane is optically before the first modulator 505. For example, the image reconstruction plane may be located at the first diffuser 514, or optically between the first modulator 505 and the first diffuser 514. In such an implementation, the image reconstruction plane may be virtual such that it is visible from downstream the first modulator 505.

The angle between the reconstructed image formed on the reconstructed image plane and the optical axis is controlled by the first illumination angle θ. The reconstructed image from the first modulator 505 is then imaged onto the second modulator 509, but the plane of the second modulator 509 is tilted with respect to the reconstructed image plane. To account for this tilt in the reconstructed image, in some implementation, the first illumination angle θ is selected to satisfy the Scheimpflug criteria of the second modulator 509. As previously described, when the second modulator 509 is a DMD, the micromirrors 202 are tilted to approximately 12°. In such an implementation, the first illumination angle θ is selected to be approximately 24°. In implementations where the second modulator 509 is a DLP, the second modulator has diagonally (i.e., 45° azimuth tilt) tilted mirrors. In this scenario, the first illumination angle θ at the first modulator 505 is also chosen to be 45°. By selecting the first illumination angle θ to satisfy the Scheimpflug criteria, the reconstructed image is completely in focus on the second modulator 509. In other implementations, the second illumination angle φ is selected to be approximately 24°. In situations where the first modulator 505 and the second modulator 509 include prisms, their respective illumination angles may be selected to account for the geometry of the prism.

In some embodiments, distortion of the reconstructed image results in the image having a trapezoidal shape on the second modulator 509. Such distortion prevents efficient fill of the second modulator 509, as the trapezoidal shape does not fill the rectangular shape of the second modulator 509. Accordingly, the first illumination angle θ may be selected such that the reconstructed image provided by the first modulator 505 is approximately rectangular on the second modulator 509, achieving improved optical efficiency. In some implementations, the reconstructed image provided by the first modulator 505 is distorted such that the image is approximately rectangular on the second modulator 509.

To achieve or adjust the first illumination angle θ, the position of the light source 501, the illumination optics 503, the first modulator 505, the illumination relay optics 507, and the second modulator 509 may be set during construction of the optical system 500. In some implementations, the positions of the light source 501, the illumination optics 503, and the illumination relay optics 507 may be set or adjusted to alter the first illumination angle θ using a respective track and actuator controlled by the controller 114. In some implementations, the reflection characteristics of the illumination optics 503 and the illumination relay optics 507 are electrically controlled by the controller 114 to alter the first illumination angle θ.

In some embodiments, the optical system 500 represents only a single color channel of the projection system 100. Accordingly, each color channel in the projection system 100 may have its own optical system configured similar to the optical system 500, each having their own respective PLM 105 and DLP 109. Each color channel may be combined following their respective optical output 513 prior to being projected on the screen 113. The optical output 513 may be a 3-channel prism, such as that found in U.S. Pat. No. 10,197,902, "High Contrast Discrete Input Prism for Image Projectors," which is incorporated herein by reference in its entirety.

The above projection systems may provide for an optical configuration utilizing the reconstructed image plane of the image reflected by a first modulator to improve the efficiency of a second modulator.

Systems, methods, and devices in accordance with the present disclosure may take any one or more of the following configurations.

(1) A beam-steering projection system, comprising: a light source configured to emit a light in response to an image signal, wherein the image signal includes image data; a phase light modulator configured to receive the light from the light source and to apply a spatially-varying phase modulation on the light, thereby to steer the light at an illumination angle and generate a first steered light; and a spatial light modulator configured to receive the first steered light, to apply a spatially-varying amplitude modulation on the light, to steer the light towards a projection optics system and to generate a second steered light, wherein a plane of a secondary image constructed after the phase light modulator and before the spatial light modulator is parallel with the phase light modulator.

(2) The beam-steering projection system according to (1), wherein the illumination angle satisfies the Scheimpflug criteria with respect to the spatial light modulator.

(3) The beam-steering projection system according to any one of (1) to (2), further comprising a diffuser disposed optically between the phase light modulator and the spatial light modulator.

(4) The beam-steering projection system according to (3), wherein the secondary image is constructed at the diffuser.

(5) The beam-steering projection system according to any one of (1) to (4), further comprising a filter disposed optically between the phase light modulator and the spatial light modulator, wherein the filter is configured to increase an effective contrast ratio of the first steered light.

(6) The beam-steering projection system according to any one of (1) to (5), further comprising a diffuser disposed optically between the light source and the phase light modulator, the diffuser configured to create a preconfigured point spread function of the light.

(7) The beam-steering projection system according to any one of (1) to (6), further comprising a filter disposed optically after the spatial light modulator, wherein the filter is configured to decrease a black level of the second steered light.

(8) The beam-steering projection system according to any one of (1) to (7), wherein the spatial light modulator is disposed within a prism.

(9) A beam-steering projection system, comprising: a light source configured to emit a light; a first modulator configured to receive the light from the light source and to apply a spatially-varying phase modulation on the light, thereby to steer the light at a first illumination angle and generate a first steered light; imaging relay optics configured to receive the first steered light and generate a second steered light at a second illumination angle; and a second modulator configured to receive the second steered light, to apply a spatially-varying amplitude modulation on the light, to steer the light towards a projection optics system and to generate a third steered light, wherein a plane of a secondary image constructed after the first modulator and before the second modulator is parallel with the first modulator.

(10) The beam-steering projection system according to (9), wherein the first modulator and the second modulator are digital micromirror devices.

(11) The beam-steering projection system according to any one of (9) to (10), further comprising a first diffuser disposed optically between the first modulator and the second modulator.

(12) The beam-steering projection system according to any one of (9) to (11), further comprising a filter disposed optically between the first modulator and the second modulator, wherein the filter is configured to increase an effective contrast ratio of the first steered light.

(13) The beam-steering projection system according to (12), wherein the filter is disposed optically between the first modulator and the imaging relay optics.

(14) The beam-steering projection system according to any one of (9) to (13), further comprising a diffuser disposed optically between the light source and the first modulator, the diffuser configured to create a precon-figured point spread function of the light.

(15) The beam-steering projection system according to any one of (9) to (14), further comprising a filter disposed optically after the second modulator, wherein the filter is configured to decrease a black level of the third steered light.

(16) The beam-steering projection system according to any one of (9) to (15), further comprising a window actuator disposed optically between the second modu-lator and the projection optics system, the window actuator configured to increase a resolution of an image defined by the third steered light.

(17) The beam-steering projection system according to any one of (9) to (16), further comprising a diffuser disposed optically between the first modulator and the second modulator, wherein the secondary image is constructed at the diffuser.

(18) A method for a beam-steering projection system, the beam-steering projection system including a light source configured to emit a light, a phase light modu-lator configured to receive the light from the light source and to apply a spatially-varying phase modula-tion on the light, thereby to steer the light at an illumination angle and generate a first steered light, and a spatial light modulator configured to receive the first steered light and to apply a spatially-varying amplitude modulation on the light, thereby to steer the light towards a projection optics system, the method com-prising: receiving, with the phase light modulator, the light from the light source, steering, with the phase light modulator, the light at the illumination angle to generate the first steered light, constructing a recon-structed image on a reconstructed image plane with the first steered light, and receiving, with the spatial light modulator, the first steered light.

(19) The method according to (18), wherein the beam-steering projection system further comprise a filter disposed optically between the phase light modulator and the spatial light modulator, and wherein the method further comprises: increasing, with the filter, an effec-tive contrast ratio of the first steered light.

(20) A non-transitory computer-readable medium storing instructions that, when executed by a processor of a beam-steering projection system, cause the beam-steer-ing projection system to perform operations comprising the method according to any one of (18) to (19).

(21) The beam-steering projection system according to (12) or (13) or any one of (14) to (17) when dependent on (12) or (13), wherein the filter is configured to block light components that elevate black level.

(22) The beam-steering projection system according to (21), (12), (13), or any one of (14) to (17) when dependent on (12) or (13), wherein the filter is config-ured to block one or more diffraction orders of the first steered light With regard to the processes, systems, methods, heuris-tics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above descrip-tion is intended to be illustrative and not restrictive. Many embodiments and applications other than the examples provided would be apparent upon reading the above descrip-tion. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary mean-ings as understood by those knowledgeable in the technolo-gies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical dis-closure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A beam-steering projection system, comprising:
   a light source configured to emit a light in response to an image signal, wherein the image signal includes image data;
   a phase light modulator configured to receive the light from the light source at an oblique illumination angle and to apply a spatially-varying phase modulation on the light, thereby to steer the light at the illumination angle and generate a first steered light;
   imaging relay optics configured to receive the first steered light and generate a second steered light at a second illumination angle; and
   a spatial light modulator configured to receive the second steered light, to apply a spatially-varying amplitude modulation on the light, to steer the light towards a projection optics system and to generate a third steered light,
   wherein a plane of a secondary image constructed after the phase light modulator and before the spatial light modulator is parallel with the phase light modulator and tilted with respect to the imaging relay optics by the illumination angle, and
   wherein the illumination angle satisfies the Scheimpflug criteria with respect to the spatial light modulator.

2. The beam-steering projection system according to claim 1, further comprising a diffuser disposed optically between the phase light modulator and the spatial light modulator.

3. The beam-steering projection system according to claim 2, wherein the secondary image is constructed at the diffuser.

4. The beam-steering projection system according to claim 1, further comprising a filter disposed optically between the phase light modulator and the spatial light modulator, wherein the filter is configured to increase an effective contrast ratio of the first steered light and to block one or more diffraction orders of the first steered light.

5. The beam-steering projection system according to claim 1, further comprising a diffuser disposed optically between the light source and the phase light modulator, the diffuser configured to create a preconfigured point spread function of the light.

6. The beam-steering projection system according to claim 1, further comprising a filter disposed optically after the spatial light modulator, wherein the filter is configured to decrease a black level of the third steered light.

7. A beam-steering projection system, comprising:
  a light source configured to emit a light;
  a first modulator configured to receive the light from the light source at an oblique first illumination angle and to apply a spatially-varying phase modulation on the light, thereby to steer the light at the first illumination angle and generate a first steered light;
  imaging relay optics configured to receive the first steered light and generate a second steered light at a second illumination angle; and
  a second modulator configured to receive the second steered light, to apply a spatially-varying amplitude modulation on the light, to steer the light towards a projection optics system and to generate a third steered light,
  wherein a plane of a secondary image constructed after the first modulator and before the second modulator is parallel with the first modulator and tilted with respect to the imaging relay optics by the first illumination angle, and
wherein the first illumination angle satisfies the Scheimpflug criteria with respect to the second modulator.

8. The beam-steering projection system according to claim 7, further comprising a first diffuser disposed optically between the first modulator and the second modulator.

9. The beam-steering projection system according to claim 7, further comprising a filter disposed optically between the first modulator and the second modulator, wherein the filter is configured to increase an effective contrast ratio of the first steered light.

10. The beam-steering projection system according to claim 9, wherein the filter is configured to block light components that elevate black level and/or to block one or more diffraction orders of the first steered light.

11. The beam-steering projection system according to claim 9, wherein the filter is disposed optically between the first modulator and the imaging relay optics.

12. The beam-steering projection system according to claim 7, further comprising a diffuser disposed optically between the light source and the first modulator, the diffuser configured to create a preconfigured point spread function of the light.

13. The beam-steering projection system according to claim 7, further comprising a diffuser disposed optically between the first modulator and the second modulator, wherein the secondary image is constructed at the diffuser.

14. A method for a beam-steering projection system, the beam-steering projection system including a light source configured to emit a light, a phase light modulator configured to receive the light from the light source at an oblique illumination angle and to apply a spatially-varying phase modulation on the light, thereby to steer the light at the illumination angle and generate a first steered light, imaging relay optics configured to receive the first steered light and generate a second steered light at a second illumination angle, and a spatial light modulator configured to receive the second steered light and to apply a spatially-varying amplitude modulation on the light, thereby to steer the light towards a projection optics system, the method comprising:
  receiving, with the phase light modulator, the light from the light source,
  steering, with the phase light modulator, the light at the illumination angle to generate the first steered light,
  constructing a reconstructed image on a reconstructed image plane with the first steered light, wherein the reconstructed image plane is parallel with the phase light modulator and tilted with respect to the imaging relay optics by the illumination angle, and
  receiving, with the spatial light modulator, the second steered light,
  wherein the illumination angle satisfies the Scheimpflug criteria with respect to the spatial light modulator.

15. The method according to claim 14, wherein the beam-steering projection system further comprises a filter disposed optically between the phase light modulator and the spatial light modulator, and wherein the method further comprises:
  increasing, with the filter, an effective contrast ratio of the first steered light, and
  blocking, with the filter, one or more diffraction orders of the first steered light.

16. A non-transitory computer-readable medium storing instructions that, when executed by a processor of a beam-steering projection system including a light source configured to emit a light, a phase light modulator configured to receive the light from the light source at an oblique illumination angle and to apply a spatially-varying phase modulation on the light, thereby to steer the light at an illumination angle and generate a first steered light, imaging relay optics configured to receive the first steered light and generate a second steered light at a second illumination angle, and a spatial light modulator configured to receive the second steered light and to apply a spatially-varying amplitude modulation on the light, thereby to steer the light towards a projection optics system, cause the beam-steering projection system to:
  receive, with the phase light modulator, the light from the light source,
  steer, with the phase light modulator, the light at the illumination angle to generate the first steered light,
  construct a reconstructed image on a reconstructed image plane with the first steered light, wherein the reconstructed image plane is parallel with the phase light modulator and tilted with respect to the imaging relay optics by the illumination angle, and
  receive, with the spatial light modulator, the second steered light,
  wherein the illumination angle satisfies the Scheimpflug criteria with respect to the spatial light modulator.

\* \* \* \* \*